United States Patent
Hayashi et al.

(10) Patent No.: US 9,894,666 B2
(45) Date of Patent: Feb. 13, 2018

(54) BASE STATION APPARATUS FOR COMMUNICATING WITH A MOBILE BASE STATION

(71) Applicant: SoftBank Corp., Tokyo (JP)

(72) Inventors: Yuichi Hayashi, Tokyo (JP); Masahiko Nanri, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 36 days.

(21) Appl. No.: 15/021,284

(22) PCT Filed: Dec. 4, 2015

(86) PCT No.: PCT/JP2015/084156
§ 371 (c)(1),
(2) Date: Mar. 11, 2016

(87) PCT Pub. No.: WO2016/088876
PCT Pub. Date: Jun. 9, 2016

(65) Prior Publication Data
US 2016/0302211 A1    Oct. 13, 2016

(30) Foreign Application Priority Data
Dec. 4, 2014    (JP) .................... 2014-245809

(51) Int. Cl.
*H04W 72/08*    (2009.01)
*H04W 16/18*    (2009.01)
(Continued)

(52) U.S. Cl.
CPC ........... *H04W 72/085* (2013.01); *H04W 8/22* (2013.01); *H04W 16/18* (2013.01); *H04W 24/08* (2013.01);
(Continued)

(58) Field of Classification Search
CPC . H04W 16/18; H04W 24/08; H04W 36/0061; H04W 52/143; H04W 52/244;
(Continued)

(56) References Cited

U.S. PATENT DOCUMENTS 7,764,975 B2    7/2010  Hosono et al.
9,125,226 B2    9/2015  Watanabe et al.
(Continued)

FOREIGN PATENT DOCUMENTS

EP    2 615 868 A1    7/2013
JP    2007-295123 A    11/2007
(Continued)

OTHER PUBLICATIONS

ETSI, "Technical Specification," LTE; Evolved Universal Terrestrial Radio Access (E-UTRA); Radio Resource Control (RRC); Protocol specification, 3GPP TS 36.331, Version, 10.3.0, Release 10, Nov. 2011.
(Continued)

*Primary Examiner* — Ian N Moore
*Assistant Examiner* — Mewale Ambaye
(74) *Attorney, Agent, or Firm* — Muirhead and Saturnelli, LLC

(57) ABSTRACT

A base station apparatus is provided, by which a new base station (cell) can be surely added in a neighboring-cell list even when a maximum value is set for the number of base stations (cells) capable being registered in the neighboring-cell list. The base station apparatus is installed in a base station communicating with a mobile station in a mobile communication network. The base station apparatus comprises memory means of memorizing a list of peripheral base stations located at a periphery of the own base station, list-update means of adding a new peripheral base station in the list when finding the peripheral base station, and delete
(Continued)

means of deleting at least one peripheral base station registered at an early timing in the list when the number of peripheral base stations registered in the list reaches to a predetermined maximum value that is set in advance.

13 Claims, 11 Drawing Sheets

(51) Int. Cl.
*H04W 8/22* (2009.01)
*H04W 36/00* (2009.01)
*H04W 52/24* (2009.01)
*H04W 72/04* (2009.01)
*H04W 24/08* (2009.01)
*H04W 52/14* (2009.01)
*H04W 52/36* (2009.01)

(52) U.S. Cl.
CPC ... *H04W 36/0061* (2013.01); *H04W 36/0083* (2013.01); *H04W 52/143* (2013.01); *H04W 52/244* (2013.01); *H04W 52/367* (2013.01); *H04W 72/042* (2013.01); *H04W 72/0473* (2013.01); *H04W 72/082* (2013.01); *Y02B 60/50* (2013.01)

(58) Field of Classification Search
CPC ............. H04W 52/367; H04W 72/085; H04W 72/082; H04W 72/042; Y02B 60/50
See application file for complete search history.

(56) References Cited

U.S. PATENT DOCUMENTS

| | | | | |
|---|---|---|---|---|
| 2006/0121907 A1* | 6/2006 | Mori | ................... | H04W 16/10 |
| | | | | 455/447 |
| 2012/0094663 A1* | 4/2012 | Awoniyi | ............... | H04W 48/16 |
| | | | | 455/434 |
| 2013/0137473 A1* | 5/2013 | Watanabe | ............. | H04W 88/02 |
| | | | | 455/500 |
| 2013/0157680 A1* | 6/2013 | Morita | ................ | H04W 52/244 |
| | | | | 455/452.2 |

FOREIGN PATENT DOCUMENTS

JP 2010-273114 12/2010
WO WO 2012/032886 A1 3/2012

OTHER PUBLICATIONS

ETSI, "Technical Specification," LTE; Evolved Universal Terrestrial Radio Access (E-UTRA); Base Station (BS) radio transmission and reception, 3GPP TS 36.104, Version 11.4.0, Release Apr. 11, 2013.

* cited by examiner

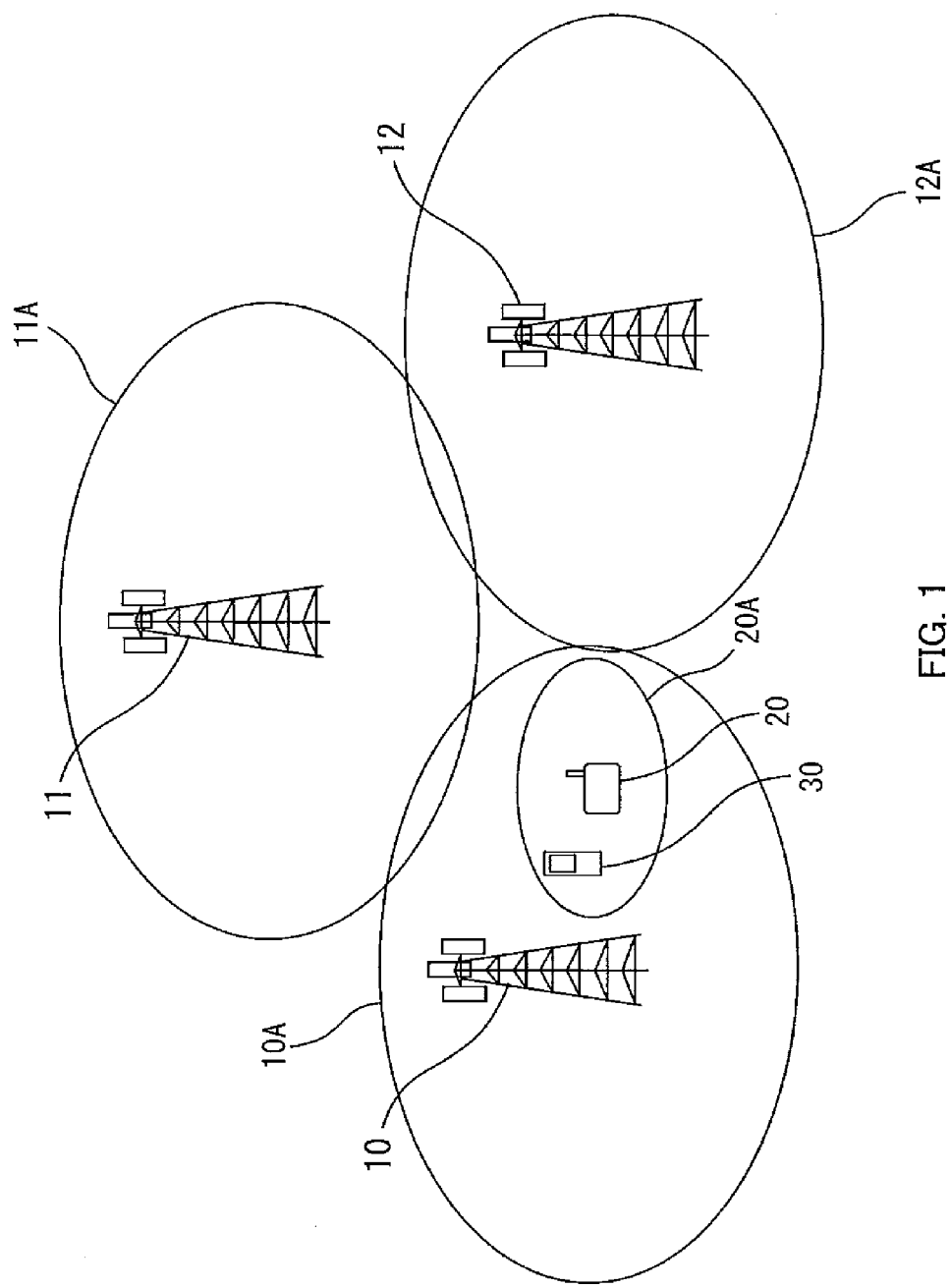

(a) point A (b) point B (c) point C

BASE STATION APPARATUS FOR COMMUNICATING WITH A MOBILE BASE STATION

TECHNICAL FIELD

The present invention relates to a base station apparatus of mobile communication.

BACKGROUND ART

A base station apparatus of performing a handover (HO) processing when a mobile station (hereinafter referred to appropriately as "user equipment (UE: User Equipment)") located in the own cell moves to a neighboring cell of another base station while maintaining a data communication, etc. in a mobile communication is conventionally known. When performing this HO processing, since information on the neighboring base stations (cells) is needed in advance, it is necessary that a neighboring-cell list that is a list of cell-identification information of the neighboring base stations (cells) is created in each base station apparatus (for example, refer to Non-Patent Literature 1). For example, as a neighboring-cell list referred to when a mobile station located in a cell of a base station (eNB: evolved Node B), to which a physical cell identifier (PCI: Physical Cell Identifier) of 500 is assigned, performs a handover in a mobile communication system of LTE (Long Term Evolution) system, a neighboring-cell list exemplified in Table 1 is created. In the neighboring-cell list in Table 1, a cell ID (Cell ID), identification information on a communications service provider (PLMN (Public Land Mobile Network) ID) and a location-registration area code (TAC: Tracking Area Code) are stored together with the physical cell identifier (PCI) with respect to each neighboring base station (cell).

TABLE 1

| PCI | Cell ID | PLMN ID | TAC |
|-----|---------|---------|-----|
| 499 | XXX | YYY | ZZZ |
| AAA | BBB | CCC | DDD |
| ... | ... | ... | ... |

As a method of creating the foregoing neighboring-cell list, a method of searching peripheral base stations, which is called as "Sniffer", and a method using receiving reports, which is called as "CGI Report", "UEMR", etc. are known. In the foregoing method of searching peripheral base stations, information on peripheral base stations (cells) is searched with a particular frequency (for example, 2.1 GHz) at a timing of activating a base station or in a predetermined cycle (for example, one hour or one week) that is set in advance, and a new peripheral base station is registered in the neighboring-cell list when the peripheral base station is searched. In the foregoing method using receiving reports, while not being restricted by a particular frequency, a base station collects information on a peripheral base station based on global identification information (CGI: Cell Global Identity), which is included in a measurement report (MR) received from a mobile station located in the own cell when performing a handover to the peripheral base station, and registers the information on peripheral base station in the neighboring-cell list. Since the information to be registered in the neighboring-cell list is collected by a plurality of methods in this way, there is a case that information on a method (information source) of acquiring information on the neighboring base station (cell) is included in the neighboring-cell list together with the information on the neighboring base station (cell). For example, as shown in Table 2, in a neighboring-cell list of a small-cell base station located neighboring with base stations A, B and B, information on an information source (Source) of acquiring cell ID information is stored together with the cell ID.

TABLE 2

| Source | Cell ID |
|--------|---------|
| Sniffer | A |
| Sniffer | B |
| CGI Report | C |

A base station of small cell smaller than a macro-cell in size (hereinafter referred to appropriately as "small-cell base station") is also known. A base station of macro-cell (hereinafter referred to appropriately as "macro-cell base station") is intentionally located. On the other had, the small-cell base station is not intentionally located, and is located, for example, at a position where a radio wave strength is weak.

A base station apparatus of the foregoing small-cell base station can perform a down link power control (DPC: Downlink Power Control) by measuring an interference level (CRS_Ec) of a downlink specific reference signal (CRS: Cell-specific Reference Signal) and a total downlink receiving power from neighboring cells by a peripheral listening function (for example, refer to Non-Patent Literature 2). In the conventional algorithm of DPC, a control target value of downlink transmission power to be used after that is determined based on measurement results of the foregoing measured instantaneous interference level and downlink receiving power.

CITATION LIST

Non-Patent Literature

Non-Patent Literature 1: 3GPP TS36.331 V10.3.0, "Evolved Universal Terrestrial Radio Access (E-UTRA); Radio Resource Control (RRC); Protocol specification", published on Oct. 10, 2011.
Non-Patent Literature 2: 3GPP TS36.104 6.2.5-1.
Non-Patent Literature 3: 3GPP TS 36.331, "Evolved Universal Terrestrial Radio Access (E-UTRA); Radio Resource Control (RRC); Protocol specification".

SUMMARY OF INVENTION

Technical Problem

In the foregoing base station apparatus creating the neighboring-cell list, since there is a possible problem that a new neighboring base station (cell) may not be added in the neighboring-cell list due to no more free space for registration in the list. For example, in the foregoing method of searching peripheral base stations, since the method is sensitive to a change of radio environment and it is necessary to leave a base station disappeared by searching the foregoing information of neighboring base stations in the list as much as possible, any free space in the neighboring-cell list is immediately filled up and then there is no more free space in the list. Furthermore, in the foregoing method using measurement reports, since a HO with receiving the measurement report (CGI report) used for registration in the neighboring-cell list is frequently performed, any free space in the neighboring-cell list is immediately filled up and then there is no more free space in the list.

Solution to Problem

To solve the foregoing problem, a base station apparatus according to an aspect of the present invention, which is a base station apparatus installed in a base station performing a radio communication with a mobile station in a mobile communication system, comprises memory means of memorizing a list of peripheral base stations located at a periphery of the own base station, list-update means of adding a new peripheral base station in the list when finding the peripheral base station, and delete means of deleting at least one peripheral base station registered at an early timing in the list when the number of peripheral base stations registered in the list reaches to a predetermined maximum value that is set in advance.

In the foregoing base station apparatus, the list-update means may search the peripheral base station and may add a new peripheral base station in the list when the new peripheral base station is found by the searching. Herein, the foregoing delete means may delete a peripheral base station in the ascending order of the number of measurement reports from the mobile station. The foregoing list-update means may perform the searching of peripheral base station and the adding to the list in a first cycle and a second cycle longer than the first cycle, and the delete means may perform the deleting of peripheral base station when the searching of peripheral base station and the adding to the list are performed in the second cycle. The first cycle may be one hour and the second cycle may be one week.

Furthermore, in the foregoing base station apparatus, the foregoing list-update means may collect information on the peripheral base station based on cell-identification information (CGI: Cell Global Identity) received from a mobile station located in the own cell when performing a handover, and may add a new peripheral base station in the list when the new peripheral base station is found by the information collecting. Herein, the foregoing list-update means may also memorize time information such as time information (for example, reception time) of the cell-identification information received from the mobile station, an acquisition time of the information on peripheral base station and so on, with respect to each peripheral base station in the list. The foregoing delete means may delete the oldest peripheral base station for which the update time of the cell-identification information report from the mobile station is oldest among the peripheral base stations in the list. The foregoing delete means may also perform the deleting of peripheral base station when receiving the cell-identification information report from the mobile station.

Moreover, in the foregoing base station apparatus, the foregoing delete means may delete one peripheral base station or may delete two or more peripheral base stations.

Further, in the foregoing base station apparatus, the base station apparatus may be a base station apparatus installed in a macro-cell base station or a base station apparatus installed in a small-cell base station.

Advantageous Effects of Invention

According to the present invention, it is capable of surely adding a new base station (cell) in a neighboring-cell list even when a maximum value is set for the number of base stations (cells) capable being registered in the neighboring-cell list.

BRIEF DESCRIPTION OF DRAWINGS

FIG. 1 is an illustration showing a schematic configuration of mobile communication system in which a base station having a base station apparatus is located, according to an embodiment of the present invention.

DESCRIPTION OF EMBODIMENTS

Figure 2A:
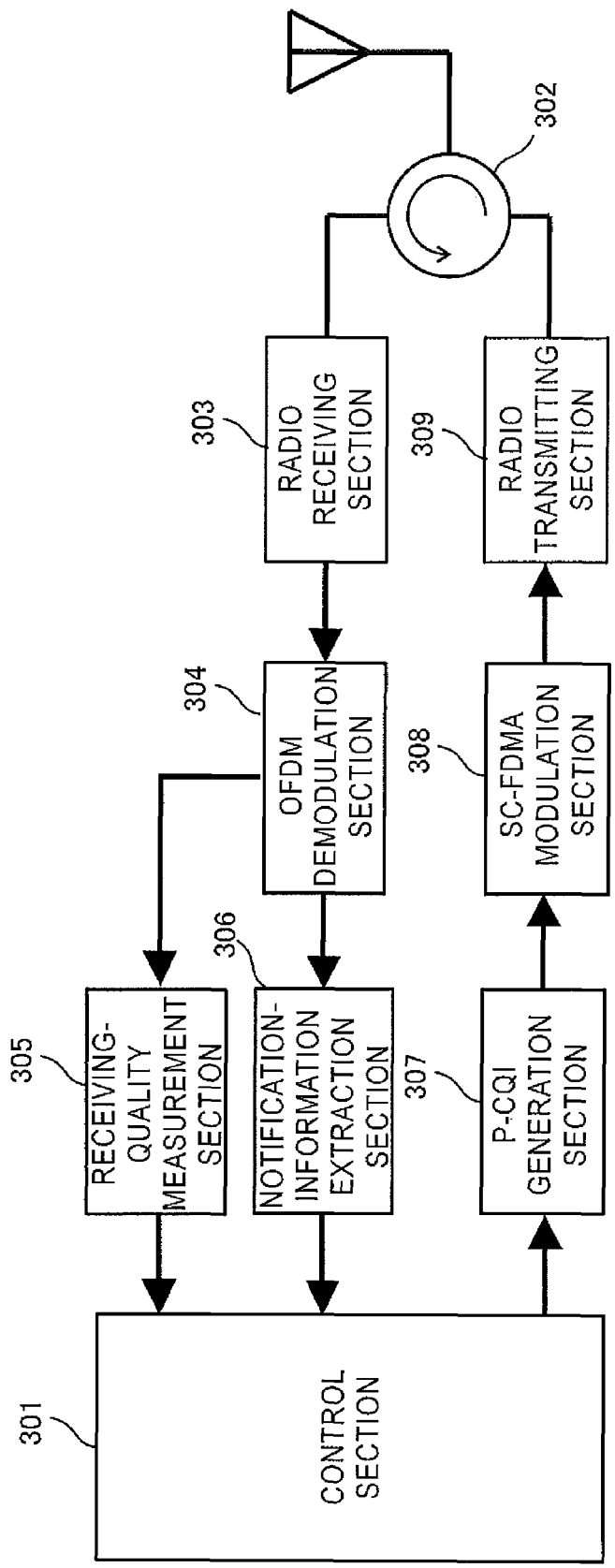
FIG. 2A is a function block diagram showing one example of schematic configuration of a main part of user equipment capable of communicating in the mobile communication system according to the present embodiment.

Hereinafter, embodiments of the present invention are described with reference to the drawings.

FIG. 1 is an illustration showing a schematic configuration of mobile communication system in which a base station having a base station apparatus is located, according to an embodiment of the present invention. In FIG. 1, the communication system of this embodiment is a communication system based on the specification of LTE, and includes macro-cell base stations 10, 11 and 12, a small-cell base station 20 located in a macro cell 10A being as a radio communication area of the macro-cell base station 10 which is a one of the foregoing macro-cell base stations. A small cell 20A being as a radio communication area of the small-cell base station 20 is included within the macro cell 10A. In the example shown in the figure, user equipment (UE) 30 being as a mobile station is located in the small cell 20A and is in a state capable of performing radio communications for a telephone and data communication etc. to the small-cell base station. Since the user equipment 30 is also located in an outer peripheral portion (boundary portion with the macro cell 10A) of the small cell 20A within the macro cell 10A, the user equipment 30 is in a situation in which a radio signal transmitted from the user equipment 30 reaches to the macro-cell base station 10 and a radio signal transmitted from the macro-cell base station 10 reaches to the user equipment 30. As a base station located around the small-cell base station 20, there are macro-cell base stations 11 and 12 in addition to the macro-cell base station 10.

It is noted that, although three macro-cell base stations 11, 12 and 13, one small-cell base station 20 and one user equipment 30 are shown in FIG. 1, the number of macro-cell base stations may be smaller than two or larger than four. Furthermore, although some cases, in which the small-cell base station 20 performs processes and controls discussed below, are described in the following embodiments, any other base station such as the macro-cell base station 10 may perform similar processes and controls. Common sections between the three macro-cell base station are described with respect to the macro-cell base station 10.

The macro-cell base station 10 is a normal wide-area base station installed outdoor in a mobile communication network, which covers a macro cell being a wide area with a radius in a range between about few hundred meters and about several kilometers, and is sometimes called as a "macro-cell base station", "Macro e-Node B", "MeNB" or the like. The macro-cell base station 10 is connected with other base stations via, for example, a wired communication line, and is configured to be capable of communicating by a predetermined communication interface. The macro-cell base station 10 is also connected with a core network of the mobile communication network via a line-termination device and a leased line and is configured to be capable of communicating with various types of nodes in the mobile communication network by a predetermined communication interface.

The small-cell base station 20, which is different from a wide-area macro-cell base station, is a transferable base station capable of being installed indoor such as in a private house, shop, office or the like, and has a radio-communication range between about few meters and about several hundred meters. Since the small-cell base station 20 is installed so as to covering a area smaller than a area covered with a wide-area base station in the mobile communication network, the small-cell base station 20 is sometimes called as a "femto base station" or sometimes called as a "Home e-Node B" or "Home eNB". The small-cell base station 20 is also connected with a core network of the mobile communication network via a line-termination device and a broad-band public communication line such as an ADSL (Asymmetric Digital Subscriber Line), an optical communication line or the like, and is configured to be capable of communicating with various types of nodes in the mobile communication network by a predetermined communication interface.

When being located in the macro cell 10A or the small cell 20A, the user equipment (UE) 30 being as a mobile station used by a user is capable of performing a radio communication with the macro-cell base station 10 or the small-cell base station 20 which corresponds to the serving cell by using a predetermined communication method and a resource.

Figure 2B:
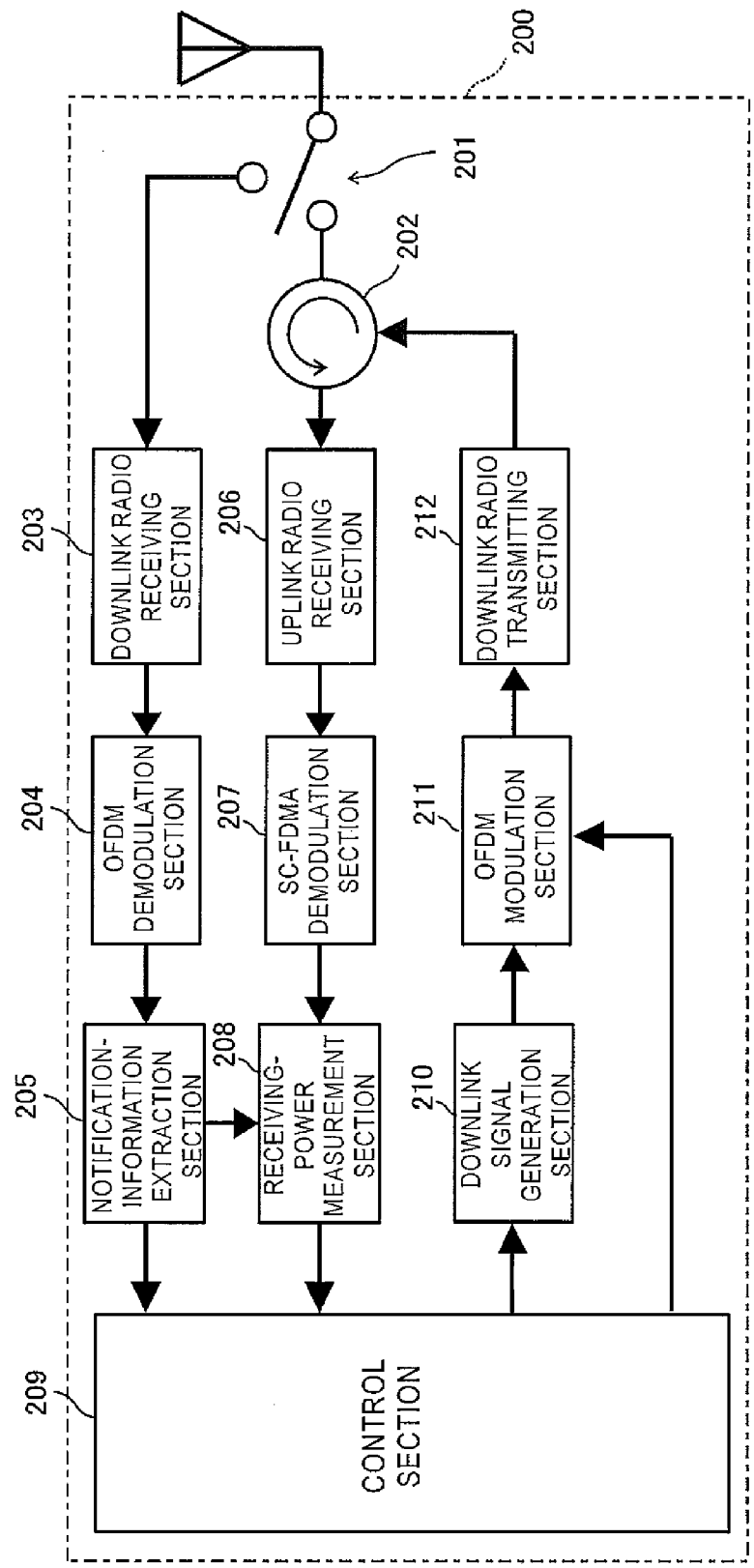
FIG. 2B is a function block diagram showing one example of schematic configuration of a main part of a base station apparatus forming a small-cell base station according to the present embodiment.

FIG. 2A is a function block diagram showing one example of schematic configuration of a main part of the user equipment 30 capable of communicating in the mobile communication system according to the present embodiment. FIG. 2B is a function block diagram showing one example of schematic configuration of a main part of a base station apparatus 200 forming a small-cell base station 20 according to the present embodiment. It is noted that, since a base station apparatus of the macro-cell base station 10 located around the small-cell base station 20 can be configured as same as the small-cell base station 20, a description of the base station apparatus of the macro-cell base station 10 will be omitted.

The user equipment 30 is configured with, for example, hardware such as a computer device having a CPU, memories, etc., an external communication interface section for the core network, a radio communication section and so on, and is capable of performing a radio communication with the base station 10, 20, etc. and the like, by executing a predetermined program. The base station apparatus 200 is configured with, for example, hardware such as a computer device having a CPU, memories, etc., an external communication interface section for the core network, a radio communication section and so on, and is capable of performing various kinds of processes and controls described below such as a memory and update of a list of peripheral base stations neighboring with the small-cell base station 20, a control of downlink transmission power, a measurement of an interference level from a peripheral cell, an interference-processing process and so on, and performing a radio communication with the user equipment 30, by executing a predetermined program.

In FIG. 2A, the user equipment 30 is provided with a control section 301, a transmission and reception sharing device (DUP: Duplexer) 302, a radio receiving section 303, an OFDM (Orthogonal Frequency Division Multiplexing) demodulation section 304, a receiving-quality measurement section 305 and a notification-information extraction section 306. The user equipment 30 is also provided with a P-CQI (Periodic-Channel Quality Indicator) generation section 307, an SC-FDMA (Single-Carrier Frequency-Division Multiple Access) modulation section 308 and a radio transmitting section 309.

The control section 301, which, for example, is configured with a computer device, controls each section based on notification information extracted by the notification-information extraction section 306, and functions as means of passing information on a downlink-signal receiving quality received by the receiving-quality measurement section 305 to the P-CQI generation section 307.

The radio receiving section 303 receives a radio signal modulated with a OFDM system for downlink specified by the LTE from the base stations 10 and 20 via an antenna and the transmission and reception sharing device 302.

The OFDM demodulation section 304 acquires a reception signal by demodulating the radio signal modulated with the OFDM system.

The receiving-quality measurement section 305 measures a downlink receiving quality (for example, electric field intensity, receiving level, etc.) when receiving the downlink radio signal, from the demodulated by the OFDM demodulation section 304, and passes information (CQI: Channel Quality Indicator) on the measured downlink receiving quality to the control section 301.

The notification-information extraction section 306 extracts notification information (for example, cell-identification information such as a CGI, a cell ID or the like, location-registration area information such as a TAC or the like, control channel information, network version information, etc.) transmitted by the base stations 10 and 20, from the reception signal demodulated by the OFDM demodulation section 304, and passes the extracted notification information to the control section 301.

The P-CQI generation section 307 generates a P-CQI signal being as a measurement report (Measurement Report) that is periodically transmitted from the user equipment 30, based on the information on downlink receiving quality (CQI) and the notification information received from the control section 301.

The SC-FDMA modulation section 308 modulates various kinds of baseband transmission signals by using a SC-FDMA (Single-Carrier Frequency-Division Multiple Access) system for uplink specified in the LTE. Particularly, in the present example, by the SC-FDMA modulation section 308, the transmission signal of P-CQI generated by the P-CQI generation section 307 is modulated with the SC-FDMA system.

The radio transmitting section 309 transmits the transmission signal such as the P-CQI maduated by the SC-FDMA modulation section 308 to the base stations 10 and 20 via the transmission and reception sharing device 302 and the antenna.

In the description herein, the foregoing P-CQI is a transmission signal including the downlink receiving quality information (CQI) and the cell-identification information such as the CGI, cell ID, etc. which are periodically notified to the base stations 10 and 20 by the user equipment 30. The user equipment 30 may also periodically transmit a reference signal (SRS) used for measurements of uplink receiving quality at the base stations 10 and 20, in addition to the P-CQI. As a physical channel for transmitting the P-CQI, for example, a PUCCH (Uplink Control Channel) format 2 specified in the LTE is used. Radio resources (time, frequency) used for transmission of the P-CQI and SRS are designated by the base stations 10 and 20.

In FIG. 2B, the base station apparatus 200 is provided with a radio signal path switching section 201, a transmission and reception sharing device (DUP) 202, a downlink radio receiving section 203, an OFDM demodulation section 204, a notification-information extraction section 205, an uplink signal receiving section 206, an SC-FDMA demodulation section 207 and a receiving-power measurement section 208. The base station apparatus 200 is also provided with a control section 209 that performs a control of transmitting power and the like, a downlink signal generation section 210, an OFDM modulation section 211 and a downlink radio transmitting section 212. It is noted that the base station apparatus 200 may include an antenna.

The downlink radio receiving section 203 receives a radio signal, which is modulated with the OFDM for downlink system specified by the LTE and includes notification information, from the macro-cell base station 10 via the antenna, the radio signal path switching section 201 and the transmission and reception sharing device 202.

The OFDM demodulation section 204 demodulates the radio signal modulated with the OFDM system and acquires a reception signal.

The notification-information extraction section 205 extracts the notification information (for example, information on SIB 2: System Information Block type 2) transmitted by the macro-cell base station 10, from the reception signal demodulated with the OFDM demodulation section 204, and passes the extracted notification information to the control section 209.

These sections of the downlink radio receiving section 203, the OFDM demodulation section 204 and the notification-information extraction section 205 also function as information acquisition means of acquiring information of electric field intensity of a transmission signal transmitted from the macro-cell base station 10 located at a periphery of the own base station, and measurement means of measuring an interference level from the macro cell 10A located at a periphery of the own base station.

The uplink signal receiving section 206 receives an uplink radio signal transmitted by the user equipment 30 that is communication with the base station 200, via the radio signal path switching section 201 and the transmission and reception sharing device 202. This radio signal includes a noise signal such as white noise generated in the radio signal path switching section 201 and so on, and a radio signal in the predetermined radio resource and physical channel that are set for transmitting the aforementioned P-CQI and SRS. When a user equipment (MUE) communicating with the macro-cell base station 10 located neighboring with the small-cell base station 20 exists, the radio signal also includes an uplink signal transmitted from the user equipment (MUE).

The SC-FDMA demodulation section 207 performs a demodulation process of SC-FDMA system for the reception signal received by the uplink signal receiving section 206.

The receiving-power measurement section 208 measures a power of the reception signal in the foregoing predetermined radio resource and physical channel obtained by the demodulation process in the SC-FDMA demodulation section 207, in each of a single subframe or a plurality of subframes, based on the notification information from the peripheral macro-cell base station 10 which is extracted by the notification-information extraction section 205. This receiving-power measurement section 208 functions as measurement means of measuring a power in a predetermined frequency band assigned to the signal (P-CQI or SRS) that is periodically transmitted from the foregoing user equipment (MUE) to the macro-cell base station 10 located in a periphery of the own base station.

The control section 209 has a memory such as a RAM, ROM or the like and functions as memory means of memorizing the neighboring base station list as exemplified in Table 1 and Table 2, which is a list of neighboring base stations located at a periphery of the own base station. Furthermore, the control section 209 also functions as list-update means of adding a new peripheral base station in the list of neighboring base stations when the peripheral base station is found, and delete means of deleting at least one peripheral base station registered at an early timing in the list of neighboring base stations when the number of peripheral base stations registered in the list of neighboring base stations reaches to a predetermined maximum value that is set in advance.

Moreover, the control section 209 also functions as transmission-power control means of controlling a downlink transmission power in a range between a maximum power (Pcell(Max)) and a minimum power (Pcell(Min)) which are set in advance, and/or transmission power control means of controlling a downlink transmission power based on a measurement result of the interference level from the macro cell 10A.

The downlink signal generation section 210 a down link signal to be transmitted to a user equipment 30 located in the cell 20A of the own base station.

The OFDM modulation section 211 modulates the downlink signal generated by the downlink signal generation section 210 with the OFDM system so that the downlink signal is transmitted with a transmission power determined by the control section 209.

The downlink radio transmitting section 212 transmits the transmission signal modulated by the OFDM modulation section 211 via the transmission and reception sharing device 202, the radio signal path switching section 201 and the antenna.

Figure 3:
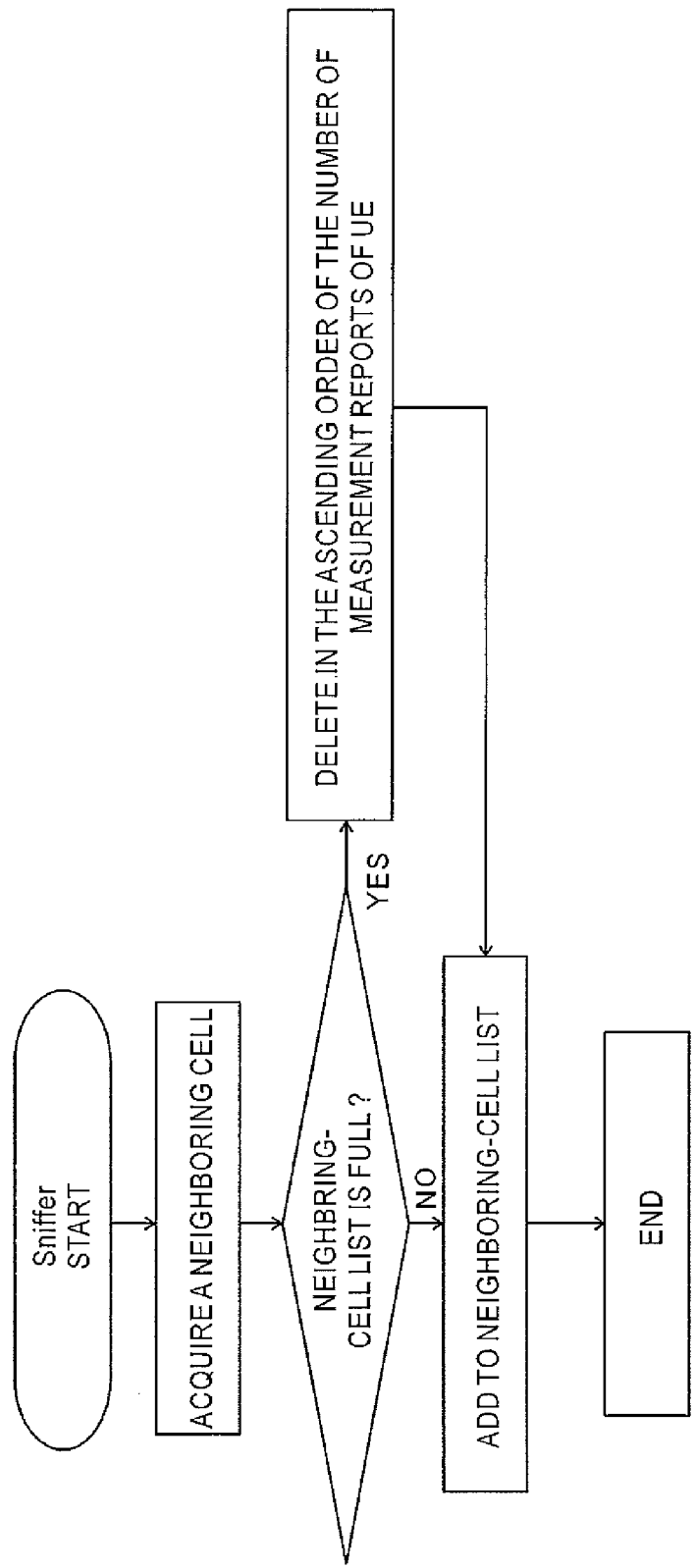
FIG. 3 is a flowchart showing one example of update processing of a neighboring-cell list in the base station apparatus of the small-cell base station according to the present embodiment.

FIG. 3 is a flowchart showing one example of update processing of a neighboring-cell list in the base station apparatus 200 of the small-cell base station 20 according to the present embodiment.

In the small-cell base station 20 of the present embodiment, a neighboring-cell list can be created by at least one method of a method of searching peripheral base stations which is called as "Sniffer" and a method using measurement reports which is called as "CGI Report", "UEMR" and the like. In the method of searching peripheral base stations, information on peripheral base stations (cells) is searched with a particular frequency (for example, 2.1 GHz) at a timing of activating a base station or in a predetermined first cycle (one hour) and/or second cycle (one week) which are set in advance, and a new peripheral base station (cell) is registered in the neighboring-cell list when the peripheral base station (cell) is searched. In the method using receiving reports, while not being restricted by a particular frequency, a base station collects information on a peripheral base station (cell) based on global identification information (CGI), which is included in a measurement report (MR) received from a user equipment 30 located in the own cell when performing a handover to a peripheral cell, and registers the information on peripheral base station (cell) in the neighboring-cell list. In this neighboring-cell list, a maximum value (for example, 64) of registrable neighboring cells is set.

The example in FIG. 3 is an example when performing an update processing of the neighboring-cell list by using the method of searching peripheral base stations (Sniffer) by the foregoing second cycle (one week).

In FIG. 3, the small-cell base station 20 starts the update processing of the neighboring-cell list by using the method of searching peripheral base stations (Sniffer) by the foregoing second cycle (one week), searches a neighboring cell located in a periphery of the own cell and determines whether the neighboring-cell list is full or not (whether there is a free space available for an additional registration in the neighboring-cell list) when acquiring information on a new neighboring cell.

Herein, if the neighboring-cell list is not full, the foregoing acquired information on new neighboring cell is added in the neighboring-cell list.

On the other hand, if the neighboring-cell list is full, information on at least one neighboring cell (peripheral base station) registered at an early timing in the neighboring-cell list is deleted. For example, information on at least one neighboring cell (peripheral base station) is deleted in the ascending order of the number of measurement reports from the user equipment among the neighboring cells in the neighboring-cell list. Then, the foregoing acquired information on new neighboring cell is added in the neighboring-cell list.

As described above, according to the example in FIG. 3, even in state that the maximum value of registrable neighboring cells (peripheral base stations) is set in the neighboring-cell list, the information of new neighboring cell (peripheral base station) can be surely added when performing the update processing of neighboring-cell list by using the foregoing method of searching peripheral base stations (Sniffer) by the second cycle (one week).

Figure 4:
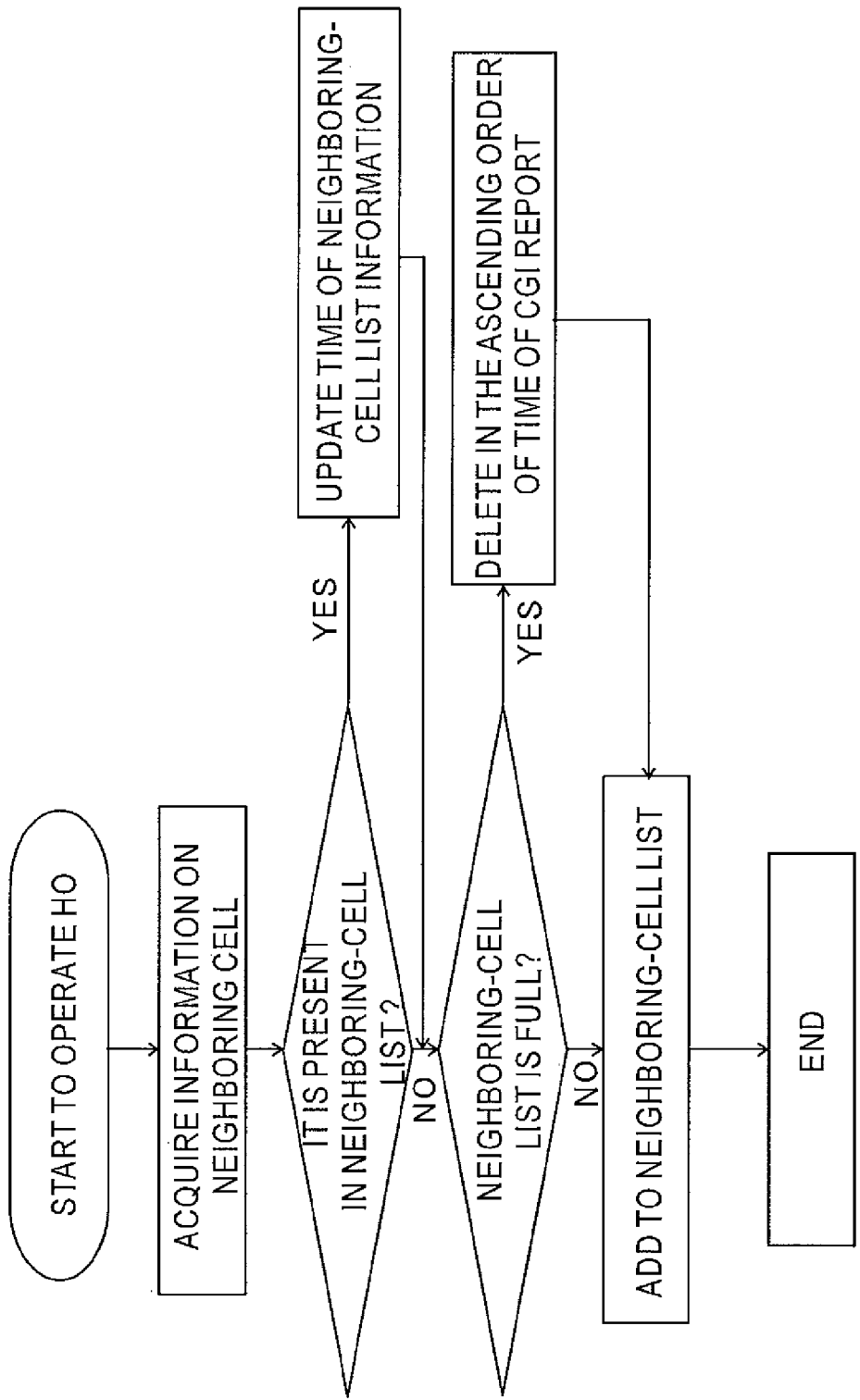
FIG. 4 is a flowchart showing another example of update processing of a neighboring-cell list in the base station apparatus of the small-cell base station according to the present embodiment.

FIG. 4 is a flowchart showing another example of update processing of the neighboring-cell list in the base station apparatus 200 of the small-cell base station 20 according to the present embodiment. The example in FIG. 4 is an example when performing an update processing of the neighboring-cell list by the foregoing method using measurement reports when performing a handover. In the example in FIG. 4, as an item in the neighboring-cell list, an item for time information of cell-identification information and time information such as acquisition time of information on a peripheral base station with respect to each neighboring cell (peripheral base station) is included.

In FIG. 4, the small-cell base station 20 starts to operate a handover processing of a user equipment 30 located in the own cell, then collects information on a neighboring cell (peripheral base station) based on cell-identification information (CGI) that is included in a measurement report (MR) received from the user equipment 30 located in the own cell, acquires information on the neighboring cell (peripheral base station) and determines whether the neighboring cell (peripheral base station) corresponding to the acquired information is present in the neighboring-cell list or not. Herein, if the neighboring cell (peripheral base station) is present in the neighboring-cell list, time information (time of CGI reporting) of the cell-identification information (CGI) is updated with respect to the neighboring cell.

Next, the small-cell base station 20 determines whether the neighboring-cell list is full or not (whether there is a free space available for an additional registration in the neighboring-cell list).

Herein, if the neighboring-cell list is not full, the foregoing acquired information on new neighboring cell is added in the neighboring-cell list.

On the other hand, if the neighboring-cell list is full, information on at least one neighboring cell (peripheral base station) registered at an early timing in the neighboring-cell list is deleted. For example, information on at least one neighboring cell (peripheral base station) is deleted in the ascending order of the time information (time of CGI reporting) of the cell-identification information (CGI) among the neighboring cells in the neighboring-cell list. Then, the foregoing acquired information on new neighboring cell is added in the neighboring-cell list.

As described above, according to the example in FIG. 4, even in state that the maximum value of registrable neighboring cells (peripheral base stations) is set in the neighboring-cell list, the information of new neighboring cell (peripheral base station) can be surely added when performing the update processing of neighboring-cell list by using the foregoing method using measurement reports when performing a handover.

It is noted that, in the examples in FIGS. 3 and 4, when deleting the information on neighboring cell (peripheral base station) from the neighboring-cell list, one neighboring cell may be deleted or two or more neighboring (peripheral base stations) cells may be simultaneously deleted.

Furthermore, although a case that the base station apparatus 200 installed in the small-cell base station 20 performs the update processing in each of the examples in FIGS. 3 and 4, the same update processing of the neighboring-cell list is applied to a base station apparatus installed in a macro-cell base station.

Figure 5A:
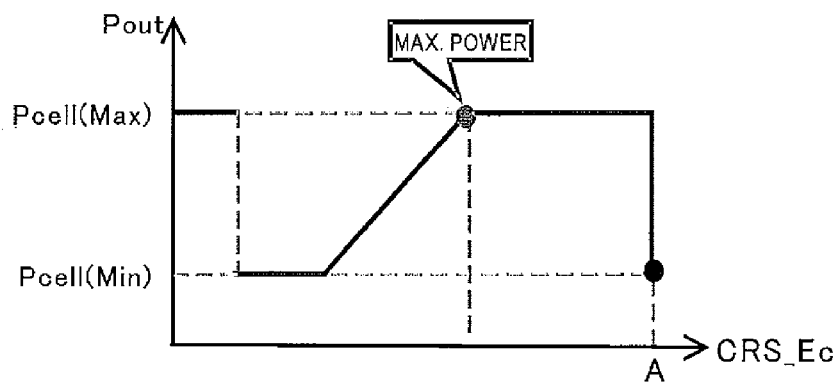
FIG. 5A is a graph showing examples of algorithm of downlink transmission power controls (DPCs) different from each other, which are capable of selectively performing when interference from a small cell to a macro cell is large, in the small-cell base station according to the present embodiment.
Figure 5B:
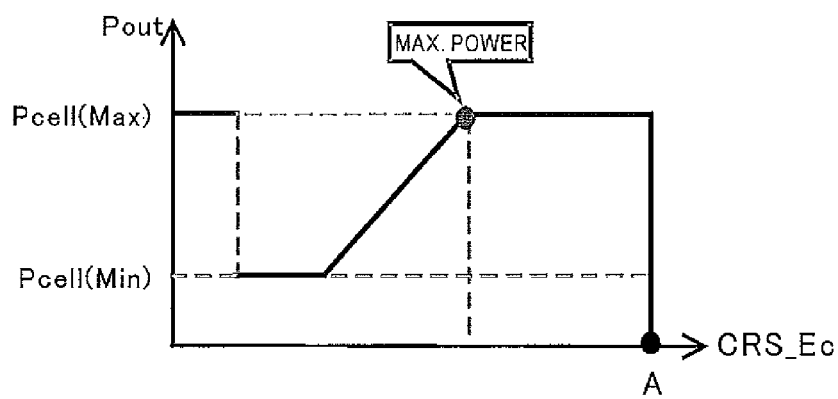
FIG. 5B is a graph showing examples of algorithm of downlink transmission power controls (DPCs) different from each other, which are capable of selectively performing when interference from a small cell to a macro cell is large, in the small-cell base station according to the present embodiment.
Figure 5C:
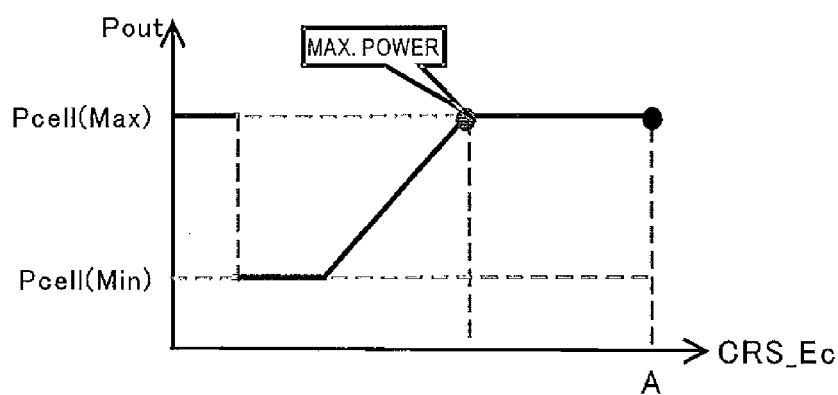
FIG. 5C is a graph showing examples of algorithm of downlink transmission power controls (DPCs) different from each other, which are capable of selectively performing when interference from a small cell to a macro cell is large, in the small-cell base station according to the present embodiment.

FIGS. 5A-5C are respectively a graph showing an example of algorithm of downlink transmission power controls (DPCs) different from each other, which are capable of selectively performing when interference from a small cell 20A to a macro cell 10A is large, in the small-cell base station 20 according to the present embodiment. The horizontal axis in FIG. 5 shows an interference level (CRS_Ec) of downlink specific reference signal (CRS) from a peripheral macro cell 10A, and the vertical axis shows a downlink transmission power (Pout) [dB] of a base station apparatus 200 of a small-cell base station 20. Pcell(Max) and Pcell(Min) in the figures are respectively the maximum power and the minimum power that can be set in a downlink transmission power control (DPC) in the base station apparatus 200 of the small-cell base station 20.

Each algorithm of downlink transmission power controls (DPCs) in FIGS. 5A-5C is same as each other until the interference level (CRS_Ec) of downlink specific reference signal (CRS) becomes a predetermined interference level A [dB] from 0 [dB] in the figures, but is different from each other with respect to a change of downlink transmission power when the interference level (CRS_Ec) becomes the interference level A.

In the algorithm of downlink transmission power control (DPC) in FIG. 5A, when the interference level (CRS_Ec) of downlink specific reference signal (CRS) becomes the predetermined interference level A, the downlink transmission power Pout is changed to the minimum power Pcell(Min).

In the algorithm of downlink transmission power control (DPC) in FIG. 5B, when the interference level (CRS_Ec) of downlink specific reference signal (CRS) becomes the predetermined interference level A, the downlink transmission power Pout is changed to 0 [W] so that the downlink transmission signal is not transmitted.

In the algorithm of downlink transmission power control (DPC) in FIG. 5C, when the interference level (CRS_Ec) of downlink specific reference signal (CRS) becomes the predetermined interference level A, the control is changed to a CRS enhancement (CRS Booting) control described below, by which a power of CRS is enhanced and a power of signal in other physical channel is reduced while maintaining a total power of downlink transmission signals at the maximum power Pcell(Max).

Figure 6:
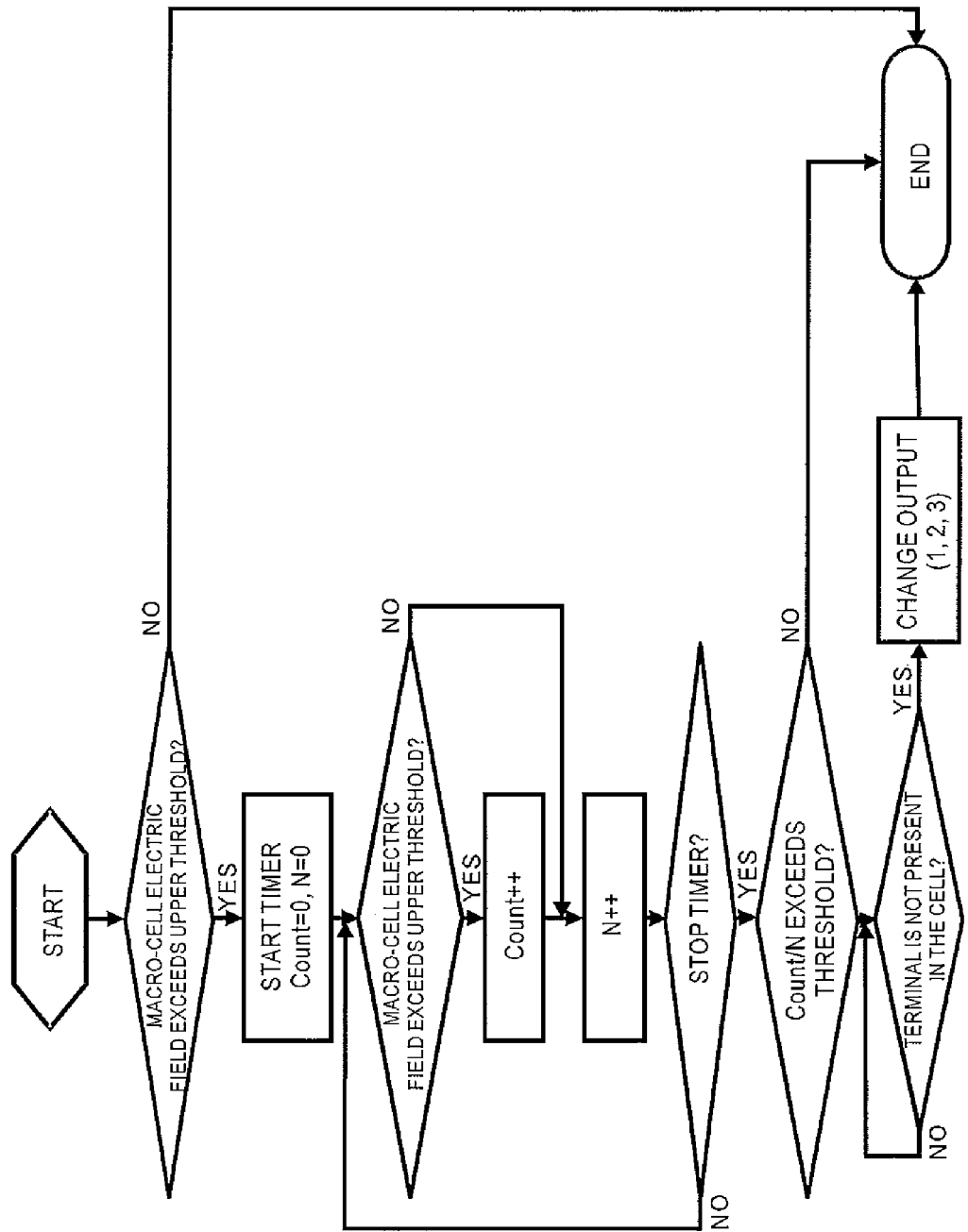
FIG. 6 is a flowchart showing one example of a downlink transmission power control (DPC) in the base station apparatus of small-cell base station according to the present embodiment.

FIG. 6 is a flowchart showing one example of a downlink transmission power control (DPC) in the base station apparatus 200 of small-cell base station 20 according to the present embodiment.

In FIG. 6, the small-cell base station 20 acquires information on electric field intensity (hereinafter referred to as "macro-cell electric field") of a transmission signal transmitted from a macro-cell base station located in a periphery of the own base station, by a measurement or the like, and then determines whether the macro-cell electric field exceeds a preset macro-cell electric-field upper threshold (hereinafter referred to as "electric-field upper threshold") or not.

If the macro-cell electric field exceeds the electric-field upper threshold, the foregoing acquisition of information on the macro-cell electric field and the foregoing determination are repeatedly performed a predetermined number of times within a predetermined time. Then, the number of times of the macro-cell electric field exceeding the electric-field upper threshold among the determinations of N times is defined as "Count", it is determined whether a value of Count/N exceeds a preset threshold or not.

When the foregoing value of Count/N exceeds the preset threshold, the algorism of downlink transmission power control (DPC) is changed to any one kind of algorism of downlink transmission power control (DPC) in FIGS. 5A-5C from normal algorism (algorism without a CRS enhancement (CRS Booting) in FIG. 5C).

As described above, according to the example in FIG. 6, in state that the macro-cell base station is located neighboring the small cell 20A of small-cell base station 20, the interference from the small-cell 20A in the downlink signals of macro cell 10A can be suppressed without lowering the power of downlink signals from the small-cell base station 20 more than necessary.

Although it is determined whether the macro-cell electric field exceeds the electric-field upper threshold or not, instead of this determination in the example in FIG. 6, it may be determined whether the macro-cell electric field is equal to or larger than the electric-field upper threshold. Moreover, although it is determined whether the value of Count/N exceeds the threshold or not in the example in FIG. 6, instead of this determination, it may be determined whether the value of Count/N is equal to or larger than the threshold.

Figure 7:
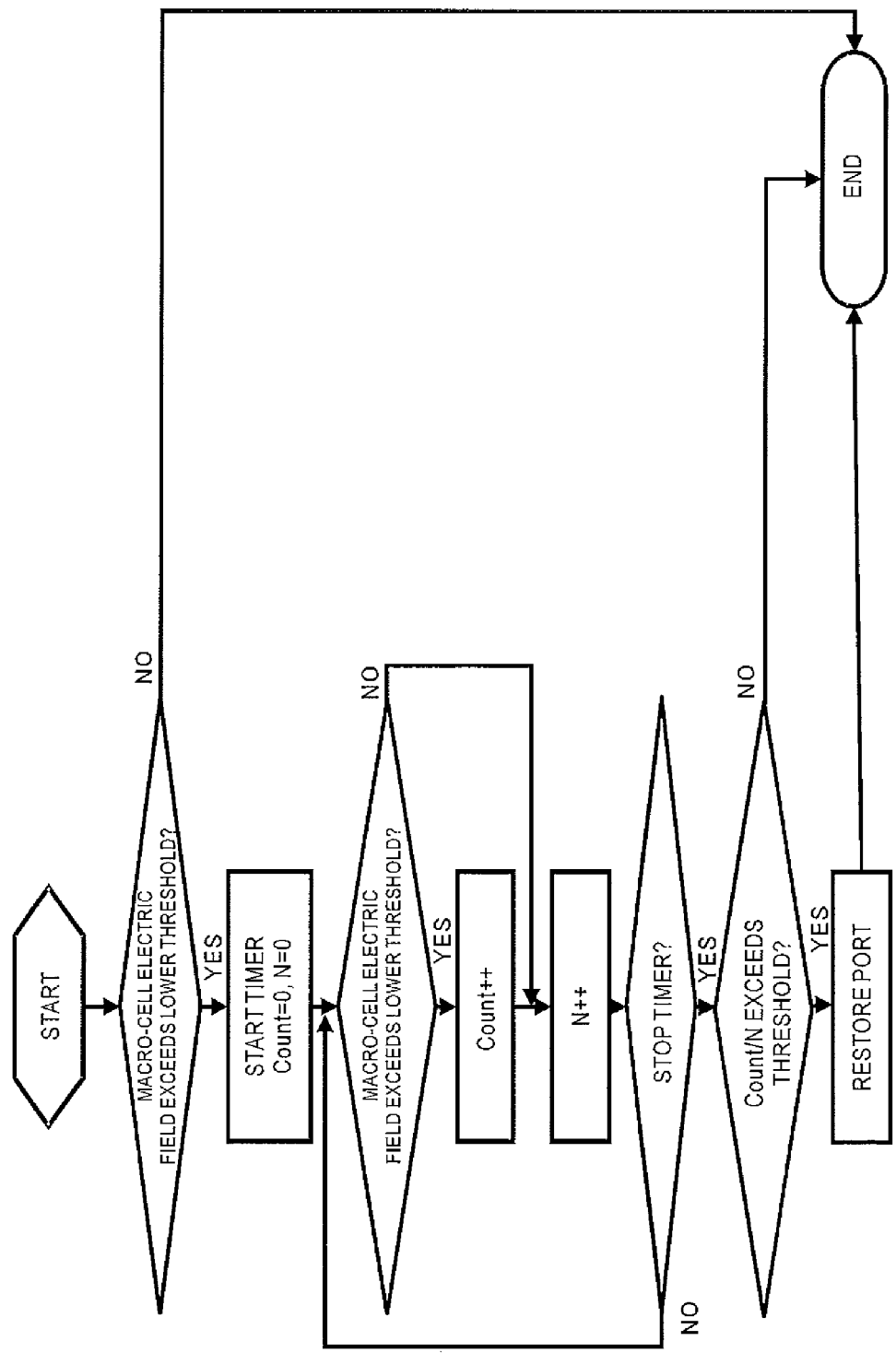
FIG. 7 is a flowchart showing another example of a downlink transmission power control (DPC) in the base station apparatus of small-cell base station according to the present embodiment.

FIG. 7 is a flowchart showing another example of a downlink transmission power control (DPC) in the base station apparatus 200 of small-cell base station 20 according to the present embodiment.

In FIG. 7, after performing the foregoing change of algorism of downlink transmission power control (DPC) in FIG. 6, the small-cell base station 20 acquires information on the macro-cell electric field by a measurement or the like, and then determines whether the macro-cell electric field exceeds a preset macro-cell electric-field lower threshold (hereinafter referred to as "electric-field lower threshold") or not, that is, whether the macro-cell electric field is smaller than the electric-field lower threshold or not.

If the macro-cell electric field exceeds the electric-field lower threshold, the foregoing acquisition of information on the macro-cell electric field and the foregoing determination are repeatedly performed a predetermined number of times within a predetermined time. Then, the number of times of the macro-cell electric field exceeding the electric-field lower threshold among the determinations of N times is defined as "Count", it is determined whether a value of Count/N exceeds a preset threshold or not.

When the foregoing value of Count/N exceeds the preset threshold, the algorism of downlink transmission power control (DPC) is returned to the normal algorism (algorism without a CRS enhancement (CRS Booting) in aforementioned FIG. 5C) from the aforementioned algorism of downlink transmission power control (DPC) in FIG. 5A, 5B or 5C after changing in FIG. 6.

As described above, according to the example in FIG. 7, in state that the interference from the small-cell 20A in the downlink signals of macro cell 10A becomes small due to some sort of causes such as a radio transmission environment in the periphery of small-cell base station 20, the power of downlink signals from the small-cell base station 20 can be returned to the maximum power.

Although it is determined whether the macro-cell electric field exceeds the electric-field lower threshold or not, instead of this determination in the example in FIG. 7, it may be determined whether the macro-cell electric field is equal to or less than the electric-field lower threshold. Moreover, although it is determined whether the value of Count/N exceeds the threshold or not in the example in FIG. 7, instead of this determination, it may be determined whether the value of Count/N is equal to or larger than the threshold.

Figure 8:
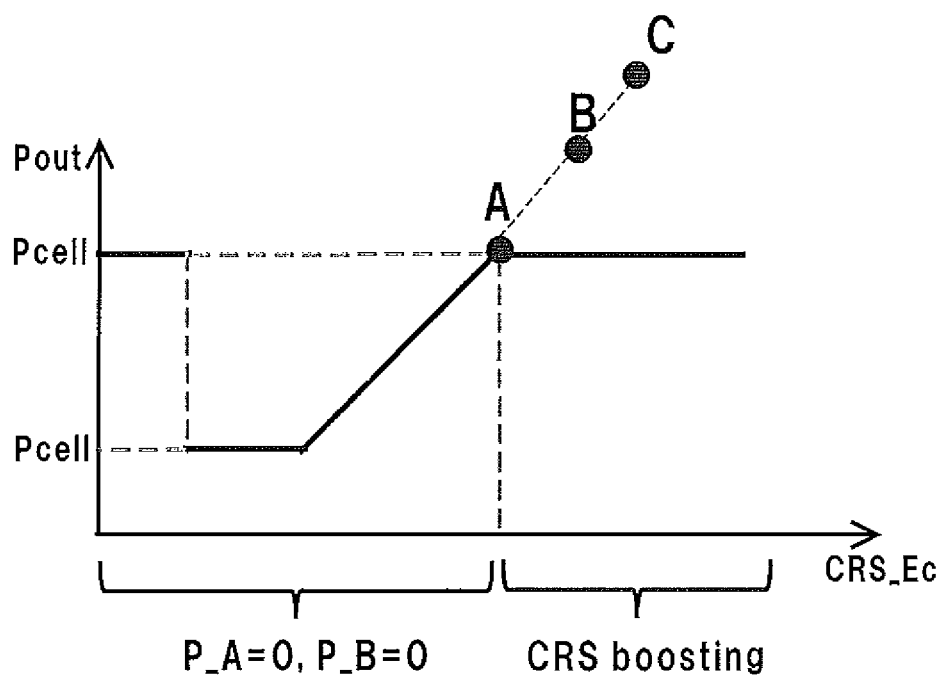
FIG. 8 is a graph showing yet another example of algorithm of downlink transmission power control (DPC) in the base station apparatus of small-cell base station according to the present embodiment.
Figure 9A:
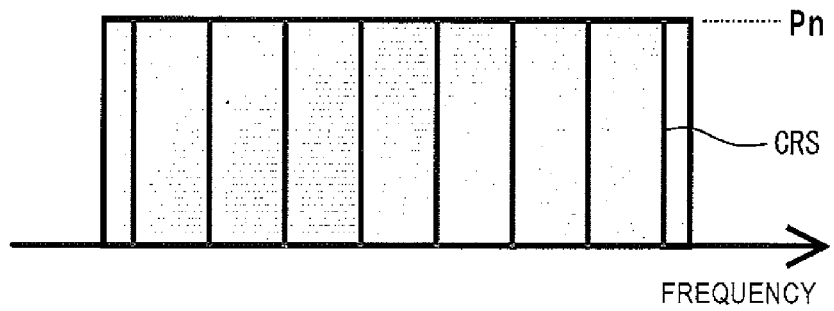
FIG. 9A is a graph showing a control pattern of power of downlink transmission signals with respect to a frequency at the point A in FIG. 8.
Figure 9B:
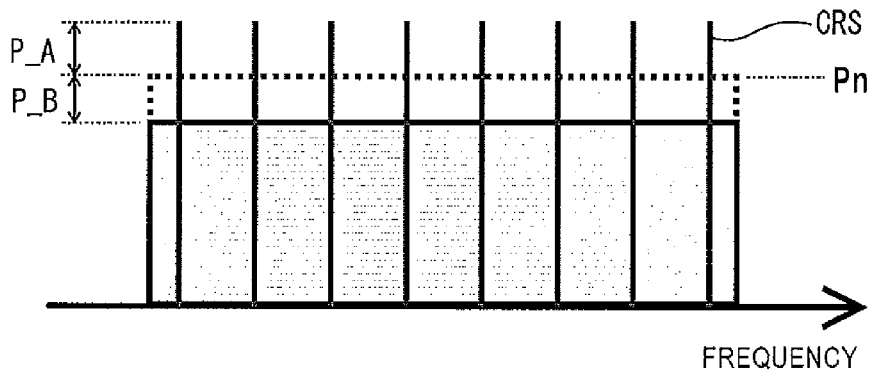
FIG. 9B is a graph showing a control pattern of power of downlink transmission signals with respect to a frequency at the point B in FIG. 8.
Figure 9C:
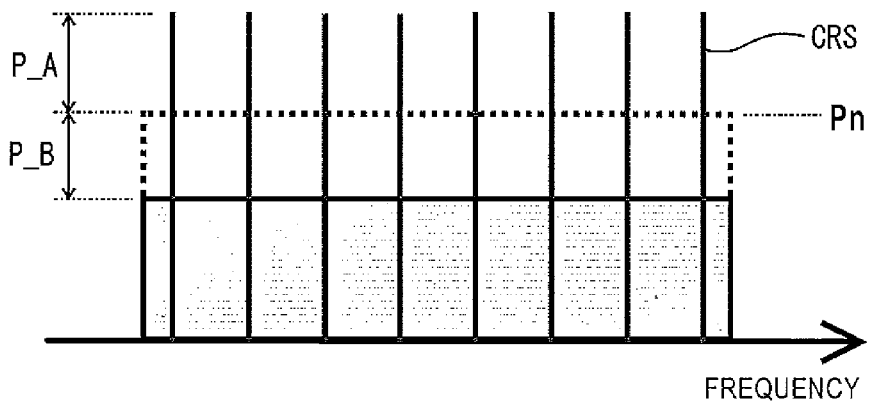
FIG. 9C is a graph showing a control pattern of power of downlink transmission signals with respect to a frequency at the point C in FIG. 8.

FIG. 8 is a graph showing yet another example of algorithm of downlink transmission power control (DPC) in the base station apparatus 200 of small-cell base station 20 according to the present embodiment. Points A, B and C in FIG. 8 show the state of CRS Booting that selectively enhances a transmission power of downlink specific reference signal (CRS) in the small cell 20A according to the enhancement of interference of the downlink specific reference signal (CRS) from the peripheral macro cell 10A. FIGS. 9A, 9B and 9C are respectively a graph showing a control pattern of power of downlink transmission signals with respect to a frequency at the point A, B and C in FIG. 8.

In FIG. 8, until the interference level (CRS_Ec) of downlink specific reference signal (CRS) from the peripheral macro cell 10A becomes the interference level [dB] at point A from 0 [dB] in the figure, as same as a conventional downlink transmission power control (DPC), any one of an offset (P_A) of transmission power of downlink specific reference signal (CRS) and an offset (P_B) of transmission power of signals in other physical channel to the standard transmission power level Pn is not set (see FIG. 9A).

When the interference level (CRS_Ec) of downlink specific reference signal (CRS) from the peripheral macro cell 10A reaches a predetermined interference level indicated with the point A in FIG. 8, the foregoing offsets of P_A and P_B are set so as to enhance the transmission power of downlink specific reference signal (CRS) and to lower the transmission power of signals in other physical channel, while maintaining the total power of downlink transmission signals at the predetermined maximum power (see FIG. 9B).

Furthermore, when the interference level (CRS_Ec) of downlink specific reference signal (CRS) from the peripheral macro cell 10A is high as shown in the points B and C, according to the high level, the foregoing offsets of P_A and P_B are set so as to further enhance the transmission power of downlink specific reference signal (CRS) and to further lower the transmission power of signals in other physical channel, while maintaining the total power of downlink transmission signals at the predetermined maximum power (see FIGS. 9B and 9C).

Figure 10:
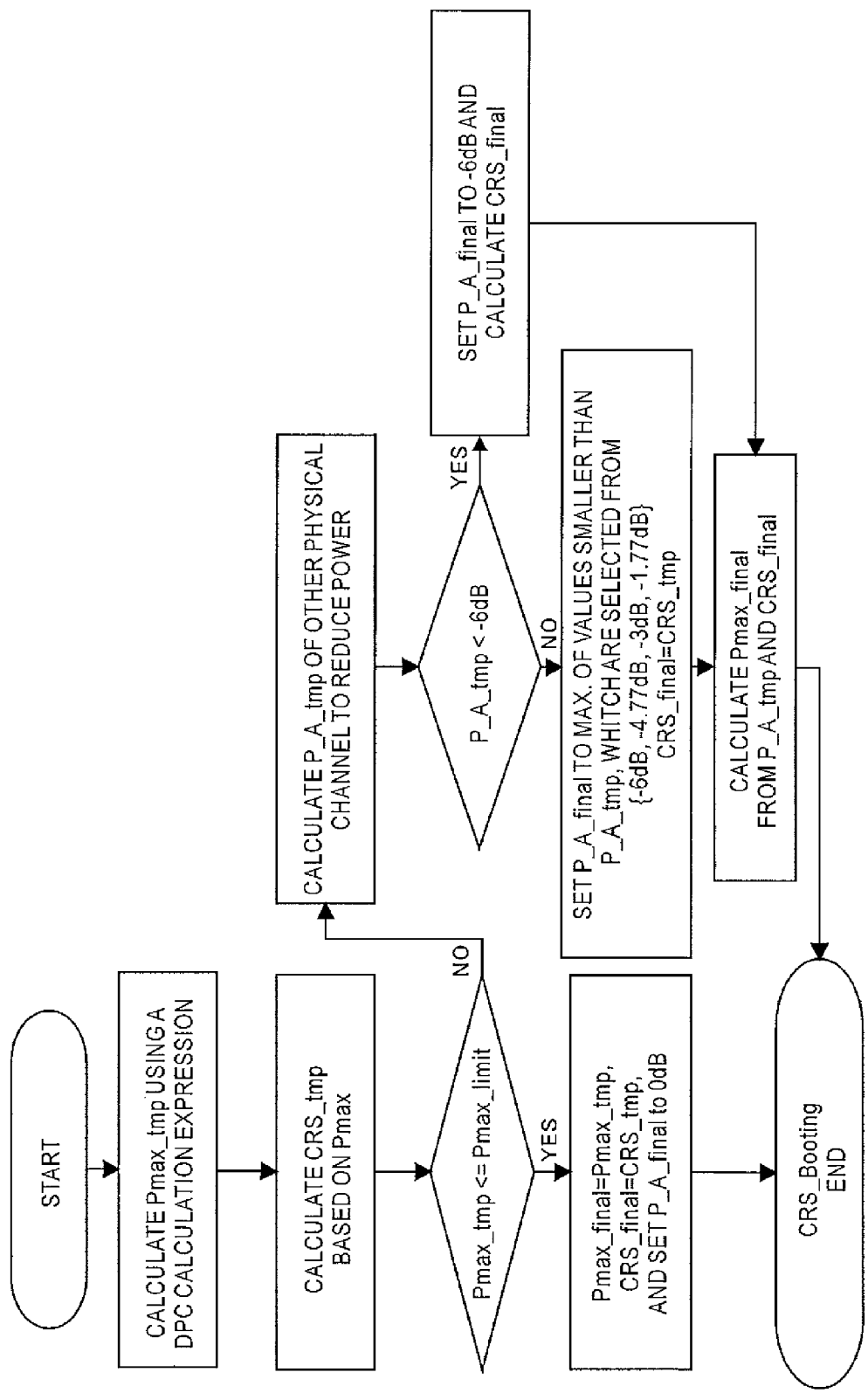
FIG. 10 is a flowchart showing yet another example of a downlink transmission power control (DPC) in the base station apparatus of small-cell base station according to the present embodiment.

FIG. 10 is a flowchart showing yet another example of a downlink transmission power control (DPC) in the base station apparatus 200 of small-cell base station 20 according to the present embodiment. In FIG. 10, "*_tmp" shows a temporary value, "*_limit" shows a predetermined value and "*_final" shows a final value. Moreover, "Pmax" shows a maximum output, "CRS" shows a power of resource element per an output of downlink specific reference signal (CRS) being as a reference signal and "P_A" shows an offset of transmission power of the downlink specific reference signal (CRS) to a normal transmission power level Pn. Herein, in the standard specification of 3GPP, it is specified that the number of values available for the output value of P_A is eight (see Non-Patent Literature 3). When the power value is high, only the values of {−6 dB, −4.77 dB, −3 dB, −1.77 dB} are available. Other values are not available because the maximum value of total power of downlink transmission signals exceeds a predetermined value of allowable maximum power. The value of offset (P_B) of transmission power of signals in other physical channels except for the CRS is set to the same value as the P_A as shown in the foregoing FIG. 9.

In FIG. 10, to begin with, a temporary value Pmax_tmp of maximum power is calculated by using a predetermined calculation expression of the downlink transmission power control (DPC), based on the value of interference level (CRS_Ec) of downlink specific reference signal (CRS) from the peripheral macro cell 10A. Moreover, based on this temporary value Pmax_tmp of maximum power, a temporary value CRS_tmp of CRS is calculated. Then, it is determined whether the temporary value Pmax_tmp of maximum power is equal to or less than the predetermined value Pmax_limit of maximum power or not.

Herein, if the temporary value Pmax_tmp of maximum power is equal to or less than the predetermined value Pmax_limit of maximum power, the temporary value Pmax_tmp of maximum power is set to the Pmax_final of maximum power, the temporary value CRS_tmp of CRS is set to the final value CRS_final of CRS, and the power offset P_A_final is set to 0 dB, and the process terminates.

On the other hand, if the temporary value Pmax_tmp of maximum power is larger than the predetermined value Pmax_limit of maximum power, the process is transferred to a setting of the CRS enhancement (CRS Booting) control.

In the setting of the CRS enhancement (CRS Booting) control, to begin with, a temporary value P_A_temp of power offset for other physical channel TO REDUCE to reduce the power is calculated, and it is determined whether the temporary value P_A_temp of power offset is smaller than −6 dB or not.

Herein, if the temporary value P_A_temp of power offset is smaller than −6 dB, the final value P_A_final of power offset is set to −6 dB and the final value CRS_final of CRS is calculated, and the Pmax_final of maximum power is calculated based on the final value P_A_final of power offset and the final value CRS_final of CRS.

On the other hand, if the temporary value P_A_temp of power offset is equal to or larger than −6 dB, a value smaller than the temporary value P_A_tmp of power offset for other physical channel is selected from {−6 dB, −4.77 dB, −3 dB, −1.77 dB}, the maximum value among the selected values is to be the final value P_A_final of power offset for other physical channel. Then, the temporary value CRS_tmp of CRS is set to the final value CRS_final, and the Pmax_final of maximum power is calculated based on the final value P_A_final of power offset and the final value CRS_final of CRS.

As described above, according to the examples in FIGS. 8-10, it is capable of ensuring a sufficiently large coverage of the small cell 20A while reducing a power of downlink signals from the small-cell base station 20 so as to be equal to or smaller than the allowable maximum power.

It is noted that he description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 macro-cell base station (peripheral base station)
10A macro cell
20 small-cell base station
20A small cell
30 user equipment (mobile station)

The invention claimed is:

1. A base station apparatus installed in a base station communicating with a mobile station in a mobile communication network, the base station apparatus comprising:
a control section that receives measurement reports from at least the mobile station, memorizes a list of peripheral base stations located at a periphery of the base station and, for each of the peripheral base stations, a number of the measurement reports corresponding to the peripheral base station, searches for the peripheral base stations with a particular frequency and, if a new peripheral base station is found, adds the new peripheral base station to the list, and, if a number of the peripheral base stations in the list reaches a predetermined maximum value, deletes at least one of the peripheral base station from the list in an ascending order of the number of the measurement reports for each of the peripheral base stations,
wherein the control section performs the searching for the peripheral base stations and the adding to the list in a first cycle and a second cycle longer than the first cycle, and
wherein the control section performs the deleting of at least one of the peripheral base stations when performing the searching for the peripheral base stations and the adding to the list are performed in the second cycle.

2. The base station apparatus according to claim 1, wherein the first cycle is one hour and the second cycle is one week.

3. A base station apparatus installed in a base station communicating with a mobile station in a mobile communication network, the base station apparatus comprising:
memory means of memorizing a list of a peripheral base station located at a periphery of the own base station;
list-update means of adding a new peripheral base station in the list when finding the peripheral base station; and
delete means of deleting at least one peripheral base station registered at an early timing in the list when a number of peripheral base stations registered in the list reaches a predetermined maximum value that is set in advance,
wherein the list-update means collects information on the peripheral base station based on a cell-identification information report received from a mobile station located in an own cell when performing a handover, and adds a new peripheral base station in the list when the new peripheral base station is found by the information collecting, and wherein the delete means deletes the oldest peripheral base station for which the update time of the cell-identification information report from the mobile station is oldest among the peripheral base stations in the list.

4. The base station apparatus according to claim 3, wherein the list-update means memorizes at least one of a reception time of the cell-identification information report received from the mobile station and an acquisition time of the information on the peripheral base station, with respect to each peripheral base station in the list.

5. The base station apparatus according to claim 3, wherein the delete means performs the deleting of the peripheral base station when receiving the cell-identification information report from the mobile station.

6. The base station apparatus according to claim 1, wherein the base station apparatus is a base station apparatus of a macro-cell base station or a base station apparatus of a small-cell base station.

7. The base station apparatus according to claim 3, wherein the base station apparatus is a base station apparatus of a macro-cell base station or a base station apparatus of a small-cell base station.

8. A base station communicating with one or more mobile stations in a mobile communication network, a method comprising:
receiving measurement reports from the one or more mobile stations; maintaining a list of peripheral base stations that are located at a periphery of the base station, and, for each of the periphery base stations, a number of the measurement reports corresponding to the peripheral base station;
during a first cycle and a second cycle longer than the first cycle, searching for peripheral base stations, and, if a new peripheral base station is found, adding the new peripheral base station to the list; and
during only the second cycle, if a number of the peripheral base stations in the list reaches a predetermined maximum value, deleting at least one of the peripheral base station from the list according to an ascending order of the number of the measurement reports for each of the periphery base stations.

9. The method according to claim 8, wherein the first cycle is one hour and the second cycle is one week.

10. The method according to claim 8, further comprising:
collecting information about the peripheral base stations based on cell-identification information reports received from the one or more mobile stations in the cell when performing a handover;
determining a new peripheral base station from the collected information; and
adding the new peripheral base station determined from the collected information to the list.

11. The method of claim 10, further comprising:
deleting at least one peripheral base station from the list as a result of determining the new peripheral based station from the collected information and adding the new peripheral base station determined from the collected information to the list.

12. The method according to claim 8, wherein the base station is a macro-cell base station.

13. The method according to claim 8, wherein the base station is a small-cell base station.

* * * * *